(No Model.)
J. A. CYPERT.
FILTER ATTACHMENT FOR CISTERN PUMPS.
No. 393,820. Patented Dec. 4, 1888.
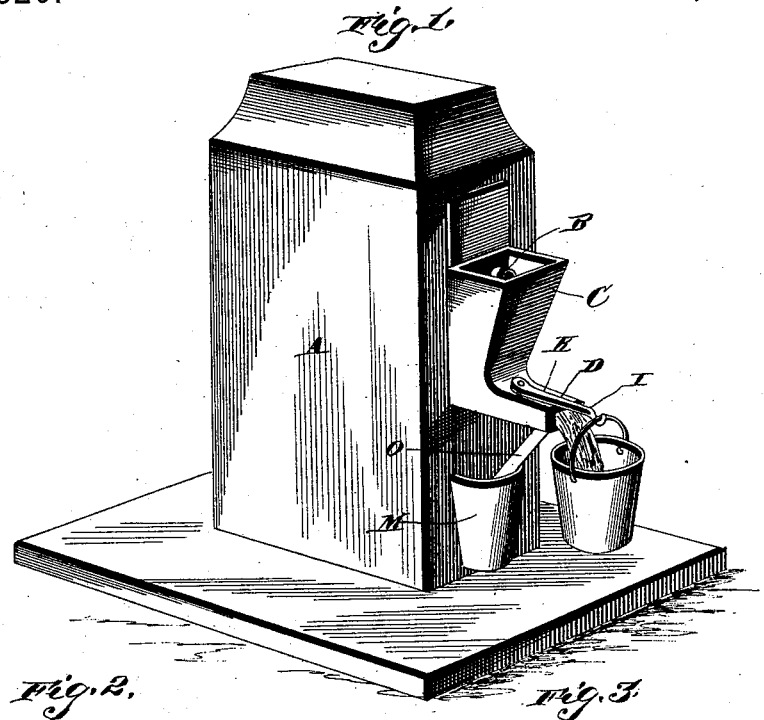
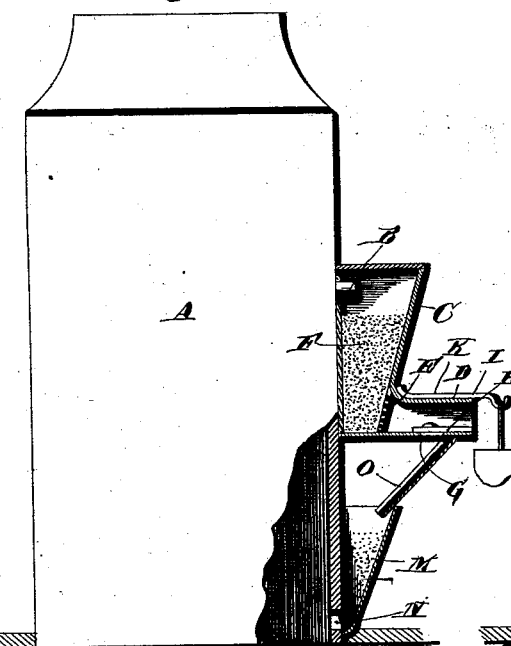
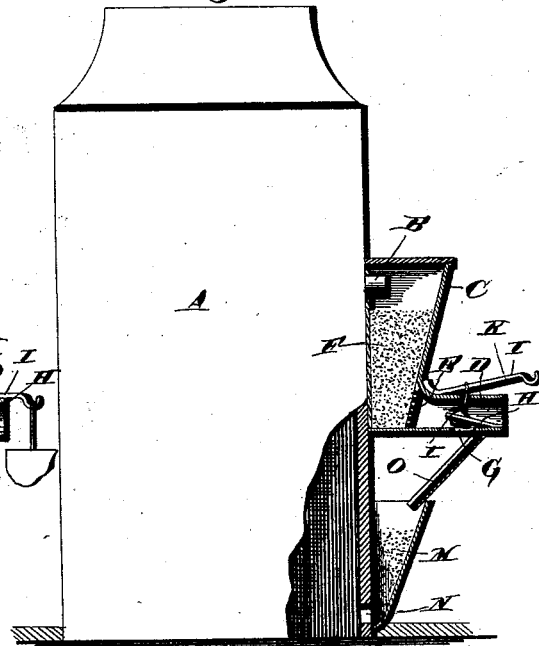
Witnesses
Inventor.
Joseph A. Cypert,
By his Attorneys

UNITED STATES PATENT OFFICE.

JOSEPH A. CYPERT, OF ROGERS, ARKANSAS, ASSIGNOR OF ONE-HALF TO WILLIAM C. CLYNOMETH, OF SAME PLACE.

FILTER ATTACHMENT FOR CISTERN-PUMPS.

SPECIFICATION forming part of Letters Patent No. 393,820, dated December 4, 1888.

Application filed May 2, 1888. Serial No. 272,593. (No model.)

*To all whom it may concern:*

Be it known that I, JOSEPH A. CYPERT, a citizen of the United States, residing at Rogers, in the county of Benton and State of Arkansas, have invented a new and useful Improvement in Filter Attachments for Cistern-Pumps, of which the following is a specification.

My invention relates to an improvement in filter attachments for cistern-pumps; and it consists in the peculiar construction and combination of devices that will be more fully set forth hereinafter, and particularly pointed out in the claims.

In the accompanying drawings, Figure 1 is a perspective view of a cistern-pump provided with a filter embodying my improvements. Fig. 2 is a vertical sectional view of the same, showing the valve in one position. Fig. 3 is a similar view showing the valve in another position.

A represents a pump, which connects with the cistern, (not shown,) is of any suitable construction, and is provided with a discharge-pipe, B.

C represents a hopper or receiving vessel, which is bolted or hooked to one side of the pump, just below the spout, and has its lower end curved outward to form a discharge-spout, D. The said hopper or receiving-vessel is provided near its lower end with a strainer, E, and is nearly filled above the said strainer with filtering material, F, such as gravel or charcoal. In the bottom of the spout D, at a suitable distance from the outer end thereof, is an opening, G, said spout being also open at its outer end.

H represents an upwardly-opening valve, which is arranged in the bottom of the spout D, and is adapted to close or uncover the opening G.

I represents a spring-hook, which is secured to the outer side of the hopper or vessel C, and has its spring-arm K extending forward over the spout D and normally elevated above the same. Said spring-arm is connected to the valve H by means of a link, I, which may be either a rod or a chain, as may be preferred. The function of the spring-hook is to normally open the valve H.

M represents a filtering vessel or pocket, which is secured on one side of the pump at a suitable distance below the vessel C and communicates with the interior of the pump case or stock, and consequently with the interior of the cistern, through an opening, N, at the lower side of said pocket or filter.

O represents an inclined trough, which has its outer end secured under the outer end of spout K and communicating with the opening G, and has its inner end arranged over the pocket or filter M. The latter is filled with charcoal, gravel, or other suitable filtering material.

The operation of my invention is as follows: When the pump is operated, the water is forced from the spout B into the vessel C, is filtered therein by the material, F, and passes downward through the spout D, and the valve H being normally open, the said filtered water escapes into the trough O, and from the latter into the pocket or filter M, and from thence it passes back into the cistern. By maintaining the operation of the pump a sufficient time all the water in the cistern may be circulated through the filter, and thereby thoroughly agitated, aerated, and purified, thereby keeping the water pure and fresh in the cistern and preventing an accumulation of foul gases therein or decomposition of the water. When it is desired to fill a bucket of water from the cistern when the pump is in operation, the bail of the bucket is rested on the spring-hook K, thereby suspending the bucket from the spout D, as shown in Fig. 1, and depressing the said spring-hook, so as to lower and close the valve H, and thus permit the water to flow from the spout D directly into the bucket, as will be readily understood. As soon as the bucket is filled and removed from the spout the spring-arm reassumes its initial position, and thereby again opens the valve H, so as to prevent the water from escaping from the spout D onto the floor or ground.

In the event that the water is to be drawn into a vessel—such as a tube that is not provided with a bail whereby it may be suspended from the spring-hook—a suitable weight will be suspended from said hook, so as to cause the water to flow, as will be readily understood.

Having thus described my invention, I claim—

1. The combination, with a pump, of the hopper or filter C, arranged below the discharge-spout thereof, having the spout D, the valve H in the bottom of said spout, and the pocket or filter M, arranged below the filter C and communicating with the source of water, substantially as described.

2. The combination, with the pump, of the hopper or filter C, having the spout D, the valve H, and the spring-arm K, connected to the said valve and normally opening the same, and the pocket or filter M, arranged below the filter C and communicating with the source of water, substantially as described.

3. In a pump, the hopper or filter C, having the discharge-spout D, provided with the valve H, and the spring-arm K, arranged above the spout D and connected to the valve H, and the receptacle M, arranged below the spout, substantially as described.

In testimony that I claim the foregoing as my own I have hereto affixed my signature in presence of two witnesses.

JOSEPH A. CYPERT.

Witnesses:
R. L. MANCE,
R. A. NORTON.